April 10, 1945.    A. ALFORD    2,373,090
GLIDE PATH BEACON
Filed May 7, 1942
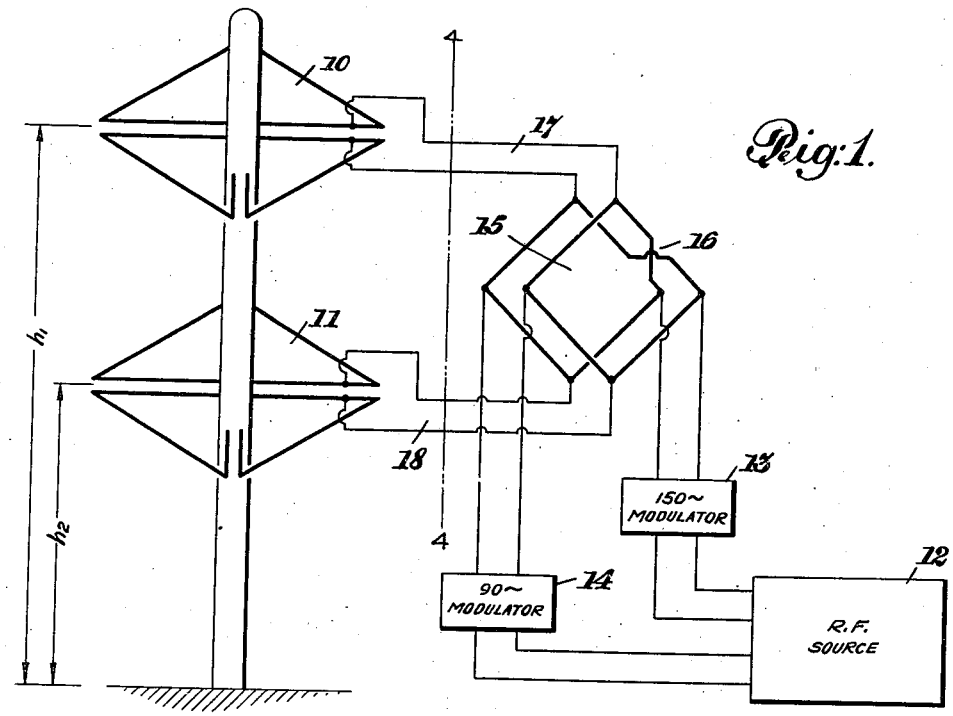
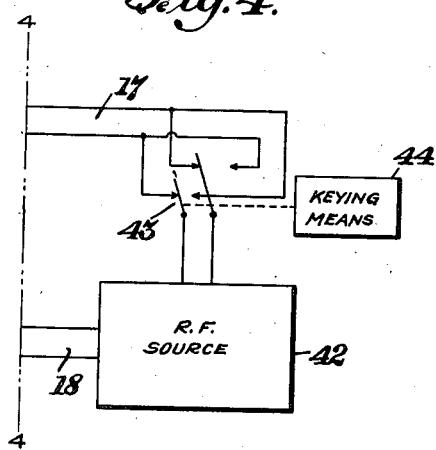
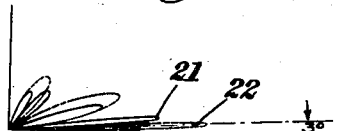
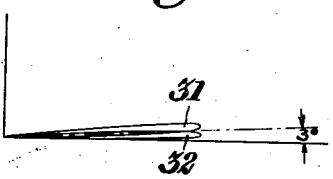
INVENTOR
ANDREW ALFORD
BY
ATTORNEY Patented Apr. 10, 1945

2,373,090

UNITED STATES PATENT OFFICE 2,373,090

GLIDE PATH BEACON

Andrew Alford, New York, N. Y., assignor to Federal Telegraph Company, Newark, N. J., a corporation of California Application May 7, 1942, Serial No. 442,069

6 Claims. (Cl. 250—11)

This invention relates to glide path beacons and more particularly to equi-signal glide path beacon arrangements.

Glide path beacons for providing a field for guiding an airplane to a landing have been proposed in which two antennae are paced above the surface of the earth and energized with differently characterized signals so that the patterns from the two differently characterized radiations intersect to produce equal signals at the glide path angle.

Another form of glide path beacon of the equi-signal type is proposed wherein a group of antennae are arranged above the surface of the earth to produce a pair of lobes having a null aligned with the desired landing angle. A second differently characterized signal is transmitted from an antenna or group of antennae having a radiation lobe overlapping the two lobes flanking this null.

It is the principal object of my invention to provide a system of equi-signal glide path arrangement of the latter type which is simplified in construction as compared with the previously proposed forms.

According to a feature of my invention the above objects and others may be obtained by utilizing only two radiating antennae spaced above the surface of the earth. One of these radiators is spaced at a height above the earth such that it produces a multilobe radiation pattern with a null point aligned with the desired landing angle. It is clear then that the lobes on either side of this null point will be of opposite phase due to the inherent characteristics of any multi-lobe pattern. A second antenna is provided mounted at a different height above the earth's surface, preferably lower, the height being so chosen that a lobe of radiation from this antenna overlaps the two lobes flanking the null point. The characteristics of the energy fed to the upper and lower loops are such that the energy from the overlapping lobe adds in part and subtracts in part from the lobes flanking the null point so that the resultant field pattern serves to define a glide path at this desired angle.

A better understanding of my invention and the objects and features thereof may be had from the particular description thereof made with reference to the accompanying drawing, in which Fig. 1 is a diagrammatic illustration of a preferred glide path construction in accordance with my invention.

Figs. 2 and 3 are diagrams illustrating the principles of my invention, and

Fig. 4 is a modification which may be substituted for the part of Fig. 1 shown to the right of line 4—4.

Energy from a radio frequency source 12 is fed through modulators 13 and 14 to opposite diagonal points of a bridge network 15. A transposition 16 is arranged in one arm of the bridge so that the carriers modulated with signals e. g. 90 and 150 cycle, combine in phase opposition in line 17 to feed antenna 10. Accordingly, the energy supplied to antenna 10 consists wholly of side band signals. Also, the side band may be considered as being of −90 cycles and +150 cycles, for example, since the carriers at the point of combination are in phase opposition. Energy, combined at the opposite terminal of the bridge, is fed over line 18 to lower antenna 11. In this instance the carriers combine in additive relation so that the carrier frequency and both modulation side bands are applied to antenna units 11.

Antenna 10 is spaced above the surface of the earth at a considerable height so that a plurality of lobes are formed. This height is such that a null occurs between two of the lobes at the desired landing angle, for example, this may be 3°, as indicated in Fig. 2.

The pattern shown at 21 of Fig. 2 corresponds to the pattern transmitted from the antenna 10. The lobes flanking the opposite sides of the first null are of opposite phase, since this is an inherent characteristic of an antenna spaced high above the surface of the earth. The lower antenna 11 produces a radiation pattern having lobes 22, one of which spans the null between the upper and lower lobe of pattern 21. Because of the phase opposition of the signals in the adjacent lobes of pattern 21, the modulations from 22 will add and subtract from the upper lobe and will add and substract in opposite relation in the next lower lobe. Accordingly, a resultant field pattern characterized by two overlapping lobes defining an equi-signal line aligned with the null point is produced as shown in Fig. 3, by the curves 31 and 32.

A brief explanation of the operating characteristics of the system will be helpful in understanding the operation and desirable adjustment of the antenna loops. Accordingly, considering two antennas paced at heights $h_1$ and $h_2$ above the earth.

Intensity from upper antenna in the vertical plane, $$A = 2 \sin(h_1 \sin \theta)$$

Radiation from lower antenna $$B = 2 \sin(h_2 \sin \theta)$$

where $h_1$ and $h_2$ = the height above the ground of the upper and lower antennae, respectively, and $\theta$ = the vertical angle measured from ground.

It will be readily seen that the pattern A will have a null at a smaller angle than pattern B since $h_1$ is greater than $h_2$. Height $h_1$ should be chosen so that the first null comes at the angle defining the desired glide path angle. Height $h_2$ should be at an angle such that a lobe therefrom overlies the angle when the null occurs. A suitable height $h_2$ is generally found to be half the height of $h_1$.

Thus, if $h_1$ is made about six wavelengths, the course will be established at a vertical angle about 4 degrees and at $h_1$ of ten wavelengths the course will be at an angle between 2.5 and 3 degrees.

Although in Fig. 1 the preferred arrangement using distinctive wave has been illustrated, it is clear that the principles of my invention apply to other types of systems. In Fig. 4 is shown a keying arrangement which may be substituted for the continuous wave modulation system of Fig. 1. In this arrangement a radio frequency source 42 is provided. If desired this radio frequency may be characterized by some tone frequency in order to provide a readily audible keyed signal. Energy from 42 is fed over lines 17 and 18 to antennae 10 and 11. Since the same spacing considerations are involved the field pattern will be similar to that shown in Fig. 2. In order that the pattern 22 will in part add and subtract from the lobes of pattern 21 on either side of the null point, I provide a switching key arrangement 43 which is operated by a keying means 44, to reverse the phase of energy fed to lines 17 and 18 with respect to one another at signalling frequency.

While I have described the principles of my invention as applied to a landing beacon, it is clear that any other use desired thereof may be made of this system. Furthermore, it should be understood that the field patterns produced by the antenna units 10 and 11 constitute the combined pattern of these antenna units and their ground images. Horizontally polarized energy is preferable, as then the ground in most installations may be considered as a perfectly conducting medium, particularly at the low angles usually involved.

It is clear that the arrangement as set forth in accordance with my invention is extremely simple to construct, requiring only two antenna units. The only adjustment necessary in order to produce the desired landing field glide path, is the adjustment of antenna height. It should be distinctly understood that various types of antenna units other than those illustrated, may be provided if desired. Furthermore, other changes and modifications may be provided within the scope of my invention. For example, the side band energy applied to antenna 10 need not be derived from the same radio frequency source as the energy supplied to antenna 11, but may come from separate sources of the same carrier frequency. Likewise, a balanced modulator may be used to provide the side band energy for antenna 10, instead of the network 15, as illustrated. However, in general the network system is much simpler than balanced modulator arrangements and is therefore, preferable.

What I claim is:

1. A glide path beacon comprising a first antenna spaced above the landing surface at a height to produce a radiation pattern having a null substantially aligned with the desired glide path angle, a second antenna spaced above the landing surface at a height to produce a radiation pattern having a lobe overlying said null, means for feeding energy to be radiated to said second antenna in a predetermined phase, means for feeding energy to be radiated to said first antenna in such phase with respect to the energy fed to said second antenna that the energy radiated by the second antenna will add in part and subtract in part from the lobes of the radiation pattern of said first antenna on each side of said null, to produce an equi-signal indication of the desired glide path.

2. A glide path beacon according to claim 1, wherein said last named means comprises a keying means for reversing the phase of energy supplied to said first antenna at signal frequency.

3. A radio beacon for guiding an aircraft to a landing comprising a first antenna mounted above the earth, a plurality of wavelengths to produce a multi-lobe pattern having a null aligned with the desired landing line, a second antenna mounted above the earth at a height less than said first antenna to produce a radiation lobe substantially overlying with said null, means to supply to said first antenna substantially only sideband energy derived from a signal modulated by two distinctive oppositely phased signals, and means for supplying to said second antenna radio frequency energy modulated by said two distinctive signals in like phase, whereby a resultant pattern is produced along said desired landing line characterised by substantial equality of said two distinctive signals.

4. A radio beacon according to claim 1, wherein said antennae are both constructed to produce horizontally polarized radiation.

5. A radio beacon according to claim 3, further comprising a radio frequency energy source, a first modulation means for modulating energy from said source with one of said distinctive signals and a second modulating means for independently modulating energy from said source with the other of said two distinctive signals, said means for supplying said first antenna comprising first comprising means for combining energy from said first and second modulating means in phase opposition, and said means for supplying said second antenna comprising second combining means for combining energy from said first and second modulating means in additive phase.

6. A radio beacon for guiding an aircraft into a landing comprising a first antenna mounted above the earth, a plurality of wavelengths whereby a multiplicity of lobes will be produced, a second antenna mounted above the earth at a height lower than said first antenna, means for supplying radio frequency energy modulated with two distinctive signals to said second antenna, said second antenna being adjusted to position an energy lobe in substantial alignment with the desired landing angle, and means for supplying to said first antenna substantially sideband energy only, said sideband energy corresponding to the signal modulation of said two distinctive signals applied in phase opposition, whereby a multi-lobe radiation pattern will be produced, said first antenna being adjusted to position the energy pattern from said first antenna to substantially align the null between two adjacent lobes with said desired landing angle, whereby a guiding line distinguished by equality of said two signals is produced along said desired angle.

ANDREW ALFORD.